US008041826B2

(12) United States Patent
Cammarata et al.

(10) Patent No.: US 8,041,826 B2
(45) **Date of Patent: *Oct. 18, 2011**

(54) AJAX PROXY INDIRECTION FOR EXTERNAL DOMAIN REQUESTS

(75) Inventors: John Paul Cammarata, Wake Forest, NC (US); Erik John Burckart, Raleigh, NC (US); Andrew Ivory, Wake Forest, NC (US); Aaron Kyle Shook, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 144 days.

This patent is subject to a terminal disclaimer.

(21) Appl. No.: 12/348,536

(22) Filed: Jan. 5, 2009

(65) Prior Publication Data

US 2009/0287836 A1 Nov. 19, 2009

Related U.S. Application Data

(63) Continuation of application No. 12/121,210, filed on May 15, 2008, now Pat. No. 7,490,141.

(51) Int. Cl.
*G06F 15/16* (2006.01)
*G06F 15/173* (2006.01)

(52) U.S. Cl. ......... 709/229; 709/225; 709/227; 709/219

(58) Field of Classification Search .................. 709/229, 709/225, 219, 227

See application file for complete search history.

(56) References Cited

U.S. PATENT DOCUMENTS

| | | | | |
|---|---|---|---|---|
| 7,289,519 | B1 * | 10/2007 | Liskov | 370/400 |
| 2008/0065679 | A1 * | 3/2008 | Fish et al. | 707/102 |
| 2008/0077980 | A1 * | 3/2008 | Meyer et al. | 726/12 |
| 2008/0077982 | A1 | 3/2008 | Hayler et al. | |
| 2008/0098301 | A1 | 4/2008 | Black et al. | |
| 2008/0147671 | A1 | 6/2008 | Simon et al. | |

* cited by examiner

*Primary Examiner* — Ashok B. Patel
*Assistant Examiner* — Lawrence Cosby
(74) *Attorney, Agent, or Firm* — Locke Lord Bissell & Liddell

(57) ABSTRACT

An Ajax proxy indirection technique enables a local, front-end proxy server to handle Ajax requests from an Ajax client that must be serviced by an external Ajax server in an external domain, instead of a local Ajax back-end server exposing itself to the external domain. The front-end proxy server accepts the Ajax client's request and forwards it to the local Ajax back-end server. The proxy server asks the local AJAX server for the credentials to be used in the "external" AJAX request. The local Ajax back-end server then responds to the proxy server with meta-data for the external domain request that the proxy will make to the external domain. The proxy server uses the credentials of the "external" AJAX request to make the external request to the external Ajax server in the external domain. The proxy server performs any authentication and necessary domain mapping with the external Ajax server before sending a response from the external Ajax server back to the client.

4 Claims, 3 Drawing Sheets

AJAX PROXY INDIRECTION FOR EXTERNAL DOMAIN REQUESTS

CROSS-REFERENCE TO RELATED APPLICATIONS

This application is a continuation of U.S. patent application Ser. No. 12/121,210, filed May 15, 2008.

FIELD

The embodiments relate to enhanced security for requests by an Ajax client that must be serviced by an external Ajax server in an external domain.

BACKGROUND

JavaScript language is a scripting language for manipulating HTML documents in browsers. It has been widely adopted in a variety of Web applications to provide more accessible web pages and improve user experience. Ajax (Asynchronous JavaScript And XML) is a technology for developing Web applications that adapts a client side script and a Web server to asynchronously exchange data using the HTTP protocol. Asynchronous invocation is a feature of Ajax. By using this feature, Web applications are capable of dynamically updating contents on a Web page without refreshing the whole page. By using Ajax, a richer and more dynamic Web application user interface can be created. Its low response times and high availability can approach the properties of a local desktop application. Ajax is a part of the JavaScript 1.3 standard and is supported by most mainstream browsers. Most web applications exploit JavaScript and Ajax to provide comprehensive functionalities, rather than simply detect a browser or validate a certain form on a page.

Ajax requests sent from browsers can only handle responses from the requested domain. Back-end services that handle Ajax requests sometimes make requests to external domains. Making external domain requests from a back-end service can be problematic since it exposes the domain of the back-end server to an external domain.

SUMMARY

An Ajax proxy indirection technique enables a local, front-end proxy server to handle Ajax requests from an Ajax client that must be serviced by an external Ajax server in an external domain, instead of a local Ajax back-end server exposing itself to the external domain. The front-end proxy server accepts the Ajax client's request and forwards it to the local Ajax back-end server. The proxy server asks the local AJAX server for the credentials to be used in the "external" AJAX request. The local Ajax back-end server then responds to the proxy server with meta-data for the external domain request that the proxy will make to the external domain. The proxy server uses the credentials of the "external" AJAX request to make the external request to the external Ajax server in the external domain. The proxy server performs any authentication and necessary domain mapping with the external Ajax server before sending a response from the external Ajax server back to the client.

The mechanism that the proxy server uses to determine if this indirection technique is be used can be either a URI based rule configured on the proxy server, information sent in the initial request from the Ajax client, or information sent in the initial response from the local Ajax server.

A shortcut technique can be used for subsequent requests by the Ajax client for the same URI of the same local Ajax server. On subsequent requests by the Ajax client, the proxy server does not need to forward the request to the local Ajax server. Instead, for subsequent requests, the proxy server can maintain the mapping of the user's credentials at the Ajax client to the credentials and host/port of the external Ajax server. The advantages of this shortcut technique for subsequent requests are that the external domain can be contacted from the entry point of the local domain without exposing any back-end server names and without requiring the front-end proxy server to relay an external request from the local Ajax server.

To summarize, the propagation of the credentials of the "external" AJAX request from the local AJAX server to the proxy server enables the proxy sever to use those credentials to make the external request and to use a shortcut in making subsequent requests, thereby improving security by avoiding the exposure of address of the local Ajax server to the external domain.

DISCUSSION OF EXAMPLE EMBODIMENTS OF THE INVENTION

Figure 1A:
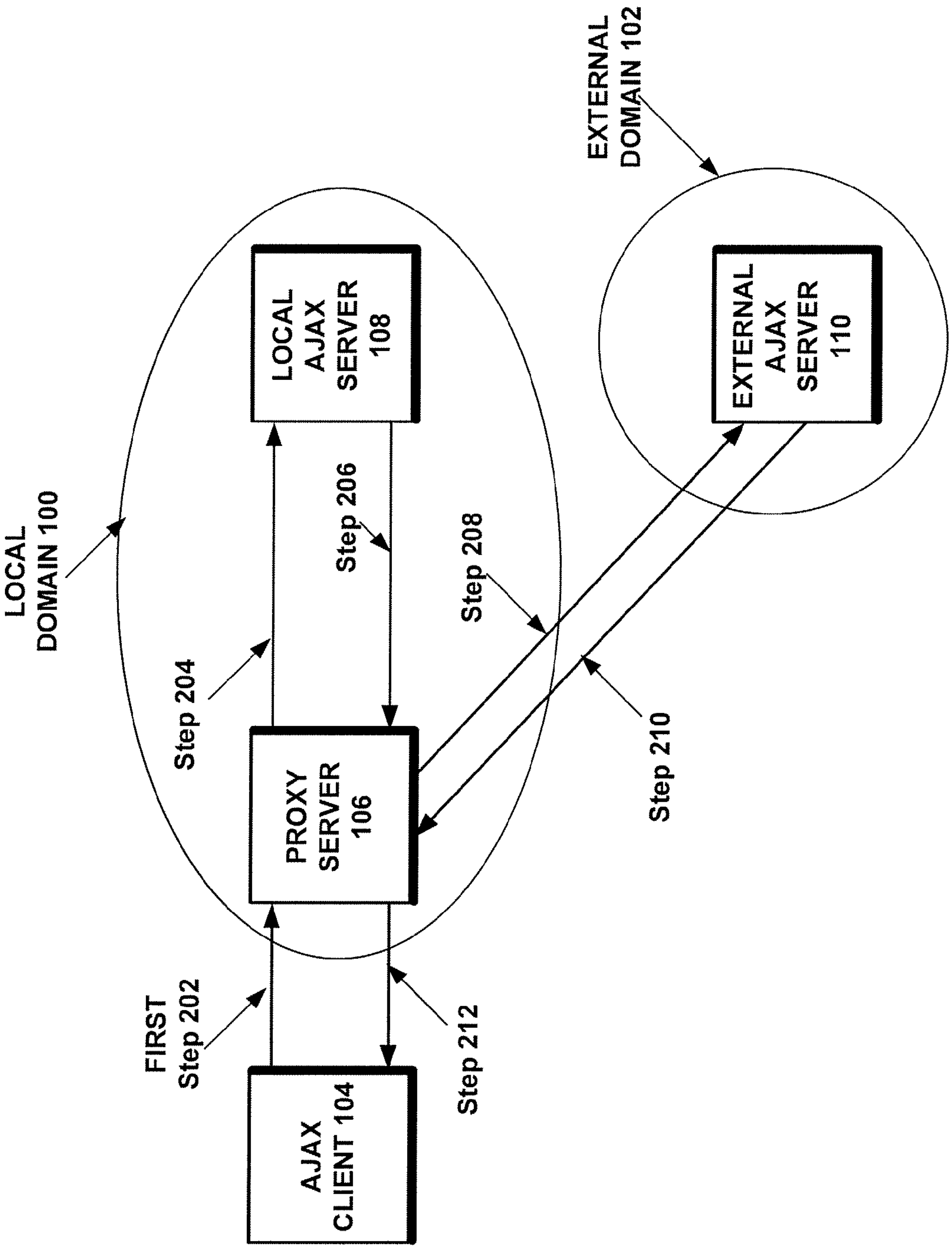
FIG. 1A illustrates a network with primary domain and an external domain, with an Ajax client sending a first Ajax request to a local Ajax service within the local domain, the request being intercepted by a proxy server, which forwards the request to a local Ajax server. The local Ajax server responds to the proxy server with metadata for an external domain request and the proxy server then initiates the external domain request to an external Ajax server in the external domain. The external Ajax server in the external domain performs the requested service and sends a response to the proxy server, which then sends a response to the requesting client.

FIG. 1A illustrates a network with local domain 100 and an external domain 102, with an Ajax client 104 sending an Ajax request for a service to a local Ajax server 108 within the local domain 100, the request being intercepted by a proxy server 106, which forwards the request to the local Ajax server 108. The local Ajax server 108 responds to the proxy server 106 with metadata for an external domain request and the proxy server 106 then initiates the external domain request to an external Ajax server 110 in the external domain 102. The external Ajax server 110 in the external domain 102 performs the requested service and sends a response to the proxy server 106, which then sends a response to the requesting client 104.

The Ajax proxy indirection technique enables the local, front-end proxy server to handle Ajax requests from the Ajax client that must be serviced by the external Ajax server in the external domain, instead of the local Ajax back-end server exposing itself to the external domain. The front-end proxy server accepts the Ajax client's request and forwards it to the local Ajax back-end server. The proxy server asks the local AJAX server for the credentials to be used in the "external" AJAX request. The local Ajax back-end server then responds to the proxy server with meta-data for the external domain request that the proxy will make to the external domain. The proxy server uses the credentials of the "external" AJAX request to make the external request to the external Ajax server in the external domain. The proxy server performs any authentication and necessary domain mapping with the external Ajax server before sending a response from the external Ajax server back to the client.

The mechanism that the proxy server uses to determine if this indirection technique is be used can be either a URI based rule configured on the proxy server, information sent in the initial request from the Ajax client, or information sent in the initial response from the local Ajax server.

Figure 1B:
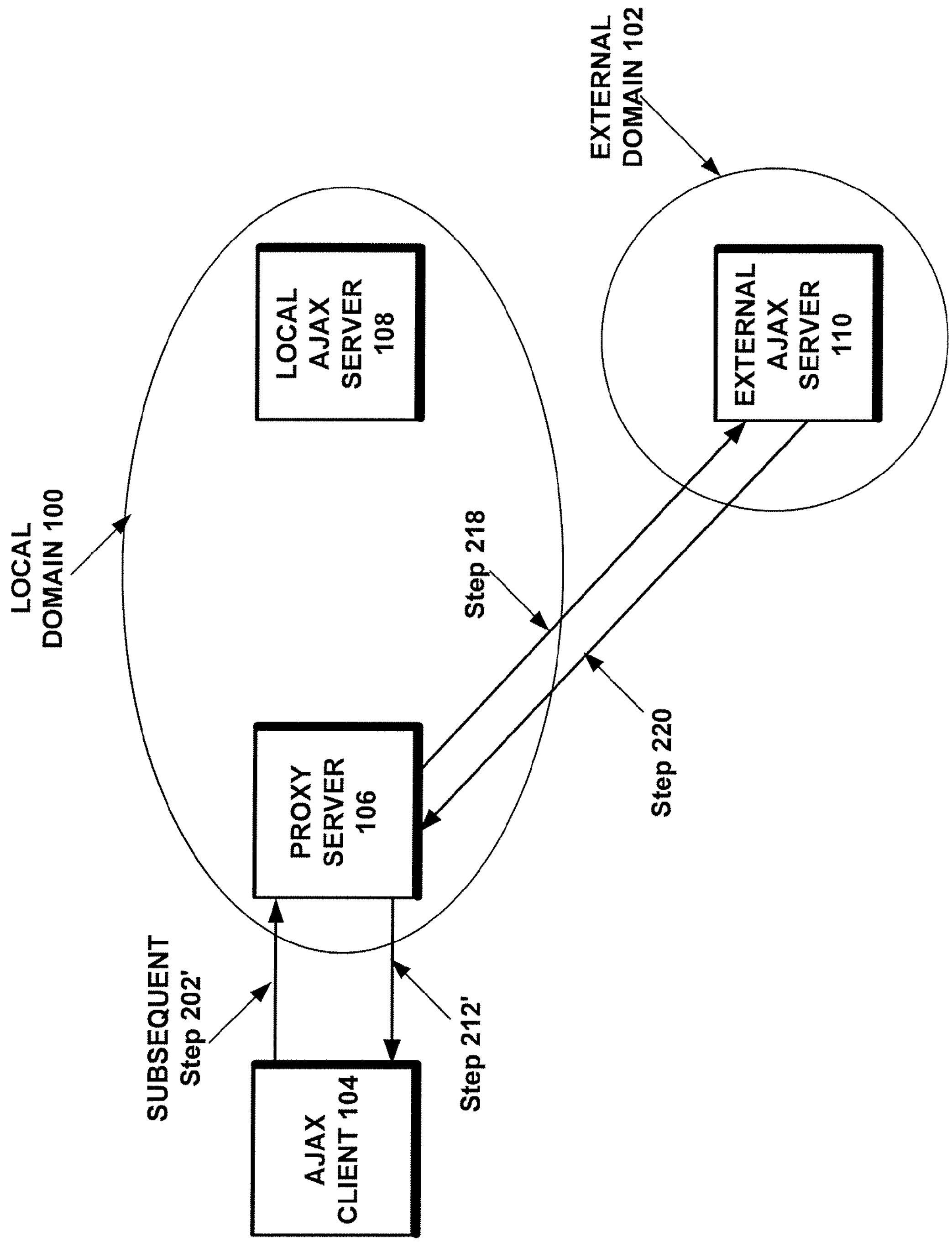
FIG. 1B illustrates a network with primary domain and an external domain, with an Ajax client sending a subsequent Ajax request to a local Ajax service within the local domain. The request is intercepted by the proxy server, which uses a shortcut to forward the request directly to the external Ajax server.

A shortcut technique can be used for subsequent requests by the Ajax client for the same URI of the same local Ajax server. FIG. 1B illustrates the network with primary domain and the external domain, with the Ajax client sending a subsequent Ajax request to the local Ajax service within the local domain. The request is intercepted by the proxy server, which uses the shortcut to forward the request directly to the external Ajax server. On subsequent requests by the Ajax client, the proxy server does not need to forward the request to the local Ajax server. Instead, for subsequent requests, the proxy server can maintain the mapping of the user's credentials at the Ajax client to the credentials and host/port of the external Ajax server. The advantages of this shortcut technique for subsequent requests are that the external domain can be contacted from the entry point of the local domain without exposing any back-end server names and without requiring the front-end proxy server to relay an external request from the local Ajax server.

To summarize, the propagation of the credentials of the "external" AJAX request from the local AJAX server to the proxy server enables the proxy sever to use those credentials to make the external request and to use a shortcut in making subsequent requests, thereby improving security by avoiding the exposure of address of the local Ajax server to the external domain.

Figure 2:
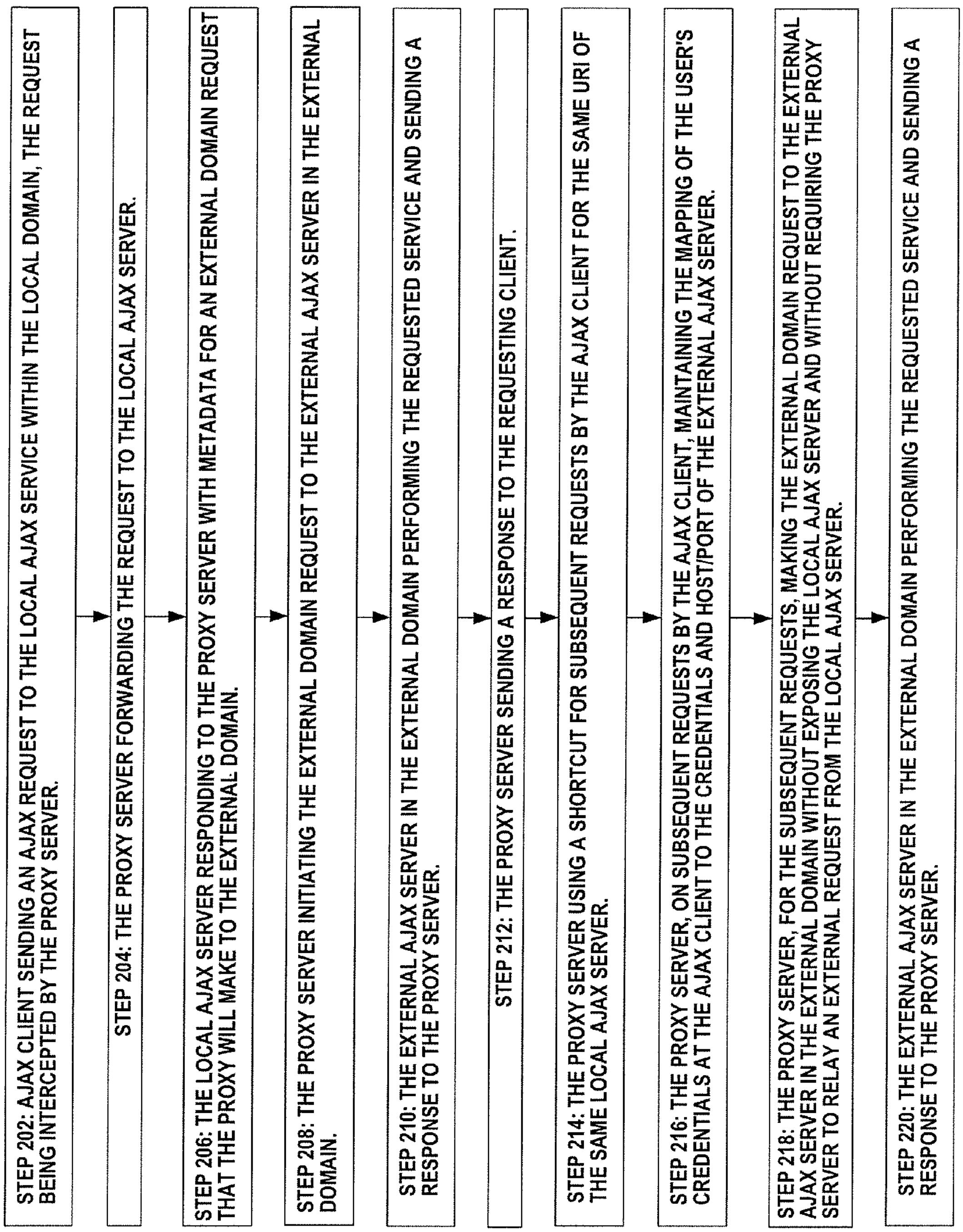
FIG. 2 is an example flow diagram of an example embodiment for the sequence of steps carried out by the network of FIGS. 1A and 1B.

FIG. 2 is an example flow diagram of an example embodiment for the sequence of steps carried out by the network of FIGS. 1A and 1B. The Ajax proxy indirection technique enables the local, front-end proxy server to handle Ajax requests from the Ajax client that must be serviced by the external Ajax server in the external domain, instead of the local Ajax back-end server exposing itself to the external domain.

Step 202 is the Ajax client sending an Ajax request to the local Ajax service within the local domain, the request being intercepted by the proxy server.

Step 204 is the proxy server forwarding the request to the local Ajax server. The mechanism that the proxy server uses to determine if this indirection technique is be used can be either a URI based rule configured on the proxy server, information sent in the initial request from the Ajax client, or information sent in the initial response from the local Ajax server. The proxy server asks the local AJAX server for the credentials to be used in the "external" AJAX request.

Step 206 is the local Ajax server responding to the proxy server with metadata for an external domain request that the proxy will make to the external domain.

Step 208 is the proxy server initiating the external domain request to the external Ajax server in the external domain. The proxy server uses the credentials of the "external" AJAX request to make the external request to the external Ajax server in the external domain. The proxy server performs any authentication and necessary domain mapping with the external Ajax server.

Step 210 is the external Ajax server in the external domain performing the requested service and sending a response to the proxy server.

Step 212 is the proxy server sending a response to the requesting client.

Step 214 is the proxy server using a shortcut for subsequent requests by the Ajax client for the same URI of the same local Ajax server.

Step 216 is the proxy server, on subsequent requests by the Ajax client, maintaining the mapping of the user's credentials at the Ajax client to the credentials and host/port of the external Ajax server.

Step 218 is the proxy server, for the subsequent requests, making the external domain request to the external Ajax server in the external domain without exposing the local Ajax server and without requiring the proxy server to relay an external request from the local Ajax server.

Step 220 is the external Ajax server in the external domain performing the requested service and sending a response to the proxy server.

In this manner, the propagation of the credentials of the "external" AJAX request from the local AJAX server to the proxy server enables the proxy sever to use those credentials to make the external request and to use a shortcut in making subsequent requests, thereby improving security by avoiding the exposure of address of the local Ajax server to the external domain.

Using the description provided herein, the embodiments may be implemented as a machine, process, or article of manufacture by using standard programming and/or engineering techniques to produce programming software, firmware, hardware or any combination thereof.

Any resulting program(s), having computer-readable program code, may be embodied on one or more computer-usable media such as resident memory devices, smart cards or other removable memory devices, or transmitting devices, thereby making a computer program product or article of manufacture according to the embodiments.

Although specific example embodiments have been disclosed, a person skilled in the art will understand that changes can be made to the specific example embodiments without departing from the spirit and scope of the invention.

What is claimed is:

1. A method, comprising:

receiving by a local, front-end proxy server a request from a requesting client for a service by a local back-end server within a local domain;

forwarding the request from the local, front-end proxy server to the local back-end server, the proxy server asking the local server for credentials to be used in an external domain request;

receiving at the local, front-end proxy server, from the local back-end server, credentials for the external domain request that the proxy server will make to an external server in an external domain;

initiating with the local, front-end proxy server the external domain request to the external server, the proxy server using the credentials of the external domain request;

receiving at the local, front-end proxy server, from the external server, a response of the requested service;

mapping with the local, front-end proxy server, credentials of the client to the credentials of the external server;

forwarding the response from the local, front-end proxy server to the requesting client;

using the mapping of the credentials of the client to the credentials of the external server as a shortcut by the local, front-end proxy server for subsequent requests by the client for the service from the local back-end server; and making external domain requests by the local, front-end proxy server to the external server in the external domain, using the shortcut, for the subsequent requests by the client for the service from the local back-end server, without exposing the local server to the external domain;

wherein said request is an Ajax request, said client is an Ajax client, and said local server and external server are Ajax servers.

2. A computer program product comprising a non-transitory computer-recordable medium including instructions embodied thereon, which when executed, perform the steps of:

receiving by a local, front-end proxy server a request from a requesting client for a service by a local back-end server within a local domain;

forwarding the request from the local, front-end proxy server to the local back-end server, the proxy server asking the local server for credentials to be used in an external domain request;

receiving at the local, front-end proxy server, from the local back-end server, credentials for the external domain request that the proxy server will make to an external server in an external domain;

initiating with the local, front-end proxy server the external domain request to the external server, the proxy server using the credentials of the external domain request;

receiving at the local, front-end proxy server, from the external server, a response of the requested service;

mapping with the local, front-end proxy server, credentials of the client to the credentials of the external server;

forwarding the response from the local, front-end proxy server to the requesting client;

using the mapping of the credentials of the client to the credentials of the external server as a shortcut by the local, front-end proxy server for subsequent requests by the client for the service from the local back-end server; and making external domain requests by the local, front-end proxy server to the external server in the external domain, using the shortcut, for the subsequent requests by the client for the service from the local back-end server, without exposing the local server to the external domain;

wherein said request is an Ajax request, said client is an Ajax client, and said local server and external server are Ajax servers.

3. An apparatus, comprising:

a local, front-end proxy server configured to receive a request from a requesting client for a service by a local back-end server within a local domain;

said local, front-end proxy server configured to forward the request to the local back-end server, the proxy server asking the local server for credentials to be used in an external domain request;

said local, front-end proxy server configured to receive from the local back-end server, credentials for the external domain request that the proxy server will make to an external server in an external domain;

said local, front-end proxy server configured to initiate the external domain request to the external server, the proxy server using the credentials of the external domain request;

said local, front-end proxy server configured to receive from the external server, a response of the requested service;

said local, front-end proxy server mapping with the local, front-end proxy server, credentials of the client to the credentials of the external server;

said local, front-end server configured to forward the response to the requesting client;

said local, front-end server configured to use the mapping of the credentials of the client to the credentials of the external server as a shortcut for subsequent requests by the client for the service from the local back-end server; and said local, front-end server configured to make external domain requests to the external server in the external domain, using the shortcut, for the subsequent requests by the client for the service from the local back-end server, without exposing the local back-end server to the external domain;

wherein said request is an Ajax request, said client is an Ajax client, and said local server and external server are Ajax servers.

4. A system, comprising:

a local back-end server within a local domain;

a client configured to request a service by the local back-end server;

a local, front-end proxy server configured to receive the request;

an external server in an external domain;

said local, front-end proxy server configured to forward the request to the local back-end server, the proxy server asking the local server for credentials to be used in an external domain request;

said local back-end server configured to send to the local, front-end proxy server, credentials for the external domain request that the proxy server will make to the external server in an external domain;

said local, front-end proxy server configured to initiate the external domain request to the external server, the proxy server using the credentials of the external domain request;

said external server configured to send to the local, front-end proxy server, a response of the requested service;

said local, front-end proxy server configured to map credentials of the client to the credentials of the external server;

said local, front-end proxy server configured to forward the response to the requesting client;

said local, front-end proxy server configured to use the mapping of the credentials of the client to the credentials of the external server as a shortcut for subsequent requests by the client for the service; and said local, front-end proxy server configured to make external domain requests to the external server in the external domain, using the shortcut, for the subsequent requests by the client for the service from the local back-end server, without exposing the local server to the external domain;

wherein said request is an Ajax request, said client is an Ajax client, and said local server and external server are Ajax servers.

* * * * *